(12) United States Patent
Joo et al.

(10) Patent No.: US 10,738,678 B2
(45) Date of Patent: Aug. 11, 2020

(54) CORRECTION METHOD OF NOX PURIFYING EFFICIENCY OF SDPF

(71) Applicants: HYUNDAI MOTOR COMPANY, Seoul (KR); KIA MOTORS CORPORATION, Seoul (KR); FEV Europe GmbH, Aachen (DE)

(72) Inventors: Ki Hyung Joo, Yongin-si (KR); Myung Jong Lee, Suwon-si (KR); Jin Woo Park, Seoul (KR); Arun Palaniappan Muthukaruppan, Aachen (DE); Waldemar Josef Kansy, Dusseldorf (DE)

(73) Assignees: HYUNDAI MOTOR COMPANY, Seoul (KR); KIA MOTORS CORPORATION, Seoul (KR); FEV EUROPE GMBH, Aachen (DE)

( * ) Notice: Subject to any disclaimer, the term of this patent is extended or adjusted under 35 U.S.C. 154(b) by 142 days.

(21) Appl. No.: 16/169,112

(22) Filed: Oct. 24, 2018

(65) Prior Publication Data
US 2019/0360377 A1 Nov. 28, 2019

(30) Foreign Application Priority Data
May 24, 2018 (KR) .................. 10-2018-0058971

(51) Int. Cl.
*F01N 11/00* (2006.01)
*F01N 3/20* (2006.01)
(Continued)

(52) U.S. Cl.
CPC .......... *F01N 3/208* (2013.01); *F01N 3/0814* (2013.01); *F01N 3/0821* (2013.01);
(Continued)

(58) Field of Classification Search
CPC .... F01N 3/208; F01N 3/2066; F01N 2610/02; F01N 2900/1602; B01D 53/9418
See application file for complete search history.

(56) References Cited

U.S. PATENT DOCUMENTS

| | | | |
|---|---|---|---|
| 2010/0050608 A1* | 3/2010 | Jayachandran | F01N 11/005 60/286 |
| 2014/0182269 A1* | 7/2014 | Jun | F01N 3/029 60/274 |

(Continued)

*Primary Examiner* — Jonathan R Matthias
(74) *Attorney, Agent, or Firm* — Brinks Gilson & Lione

(57) ABSTRACT

A correction method of NOx purifying efficiency of SDPF includes: measuring a temperature change per unit time inside the SDPF, determining whether the temperature change per unit time inside the SDPF is below a first predetermined value, determining whether a difference between a maximum value and a minimum value of temperature of respective parts inside the SDPF is below a second predetermined value if the temperature change per unit time inside the SDPF is below the first predetermined value, determining whether a temperature inside the SDPF is in a low temperature region if the difference between the maximum value and the minimum value of temperature of the respective parts inside the SDPF is below the second predetermined value, and performing a low temperature region correction if the temperature inside the SDPF is in the low temperature region.

17 Claims, 8 Drawing Sheets

(51) Int. Cl.
*F01N 3/08* (2006.01)
*F01N 3/035* (2006.01)
*B01D 53/94* (2006.01)

(52) U.S. Cl.
CPC ........ *F01N 3/0842* (2013.01); *B01D 53/9418* (2013.01); *B01D 53/9495* (2013.01); *B01D 2257/40* (2013.01); *B01D 2258/012* (2013.01); *B01D 2259/4566* (2013.01); *F01N 3/035* (2013.01); *F01N 2570/14* (2013.01); *F01N 2610/02* (2013.01); *F01N 2900/1602* (2013.01)

(56) References Cited

U.S. PATENT DOCUMENTS

2017/0043295 A1\* 2/2017 Minezawa ............ F01N 11/007
2018/0283248 A1\* 10/2018 Upadhyay ............ F01N 11/002

\* cited by examiner

CORRECTION METHOD OF NOX PURIFYING EFFICIENCY OF SDPF

CROSS-REFERENCE TO RELATED APPLICATION

This application claims priority to and the benefit of Korean Patent Application No. 10-2018-0058971, filed on May 24, 2018, the entire contents of which are incorporated herein by reference.

FIELD

The present disclosure relates to a correction method of NOx purifying efficiency of a selective catalytic reduction catalyst on diesel particulate filter (SDPF).

BACKGROUND

The statements in this section merely provide background information related to the present disclosure and may not constitute prior art.

Generally, exhaust gas discharged from an exhaust manifold of an engine is induced to a catalytic converter that is mounted in the middle of an exhaust pipe and purified, and the noise thereof is reduced while passing through a muffler before the exhaust gas is discharged to the outside through a tail pipe.

The catalytic converter purifies the pollution materials that are included in the exhaust gas. Further, a particulate filter is mounted on the exhaust pipe to trap particulate material (PM) that is included in the exhaust gas.

A selective catalytic reduction (SCR) catalyst is a type of catalytic converter purifying NOx included in the exhaust gas. If reducing agents such as urea, ammonia, carbon monoxide and hydrocarbon (HC) are provided to the exhaust gas, the NOx included in the exhaust gas is reduced by oxidation/reduction reaction with the reducing agents in the SCR catalyst.

Recently, a lean NOx trap (LNT) is used with the SCR catalyst to deal with reinforced exhaust gas regulations. The LNT absorbs NOx included in the exhaust gas if the engine operates in a lean atmosphere, and desorbs the absorbed NOx if the engine operates in a rich atmosphere, and thus reduces the desorbed NOx as well as NOx included in the exhaust gas.

In one form, when the LNT and the SCR catalyst are used together, the SCR catalyst may be coated on a diesel particulate filter due to space restriction. A selective catalytic reduction catalyst on diesel particulate filter (SDPF) absorbs particulate matter contained in the exhaust gas and eliminates NOx contained in the exhaust gas.

We have discovered that, in a predetermined driving condition, there is a difference between an NOx purifying efficiency detected by a sensor and a real NOx purifying efficiency. If a temperature gradient per unit time of the internal temperature of the SDPF is larger than a predetermined value, an NOx slip and an NH3 slip can be corrected by increasing or decreasing an amount of urea injection.

We have also discovered that if the temperature gradient per unit time of the internal temperature of the SDPF is not greater than the predetermined value, factors affecting the NOx purifying efficiency are changed according to the internal temperature of the SDPF. For example, when the internal temperature of the SDPF is in a low temperature region, absorption of the NH3 substantially affects a purifying performance, and space velocity (SV) of the SDPF, namely, volume flow rate per volume in the SDPF substantially affects an NOx purifying performance. By contrast, in a high temperature region, absorption rarely occurs and the NH3 directly reacts in a gas state, and thus the SV has relatively low impact on the purifying performance. In addition, since oxidation of NH3 (i.e., NH3→NOx transformation) occurs in a high temperature, the NOx purifying efficiency drops, therefore, output value of the NOx purifying efficiency map is adjusted in the high temperature.

SUMMARY

The present disclosure provides a correction method of NOx purifying efficiency of a selective catalytic reduction catalyst on diesel particulate filter (SDPF) which improves urea injection by correcting an NOx purifying efficiency based on temperature regions in an SDPF catalyst, reduces NH3 slipped and exhausted outside and eliminates NOx in the exhaust gas.

A correction method of NOx purifying efficiency of SDPF in an exemplary form of the present disclosure includes: measuring, by a controller, a temperature change per unit time inside the SDPF; determining, by the controller, whether the temperature change per unit time inside the SDPF is less than or equal to a first predetermined value; determining, by the controller, whether a difference between a maximum value and a minimum value of temperature of respective parts inside the SDPF is less than or equal to a second predetermined value when the temperature change per unit time inside the SDPF is less than or equal to the first predetermined value; determining, by the controller, whether a temperature inside the SDPF is in a low temperature region when the difference between the maximum value and the minimum value of temperature of the respective parts inside the SDPF is less than or equal to the second predetermined value; and performing, by the controller, a low temperature region correction when the temperature inside the SDPF is in the low temperature region.

In another form, the correction method of NOx purifying efficiency of SDPF may further include: determining, by the controller, whether the temperature inside the SDPF is in a transient region when the temperature inside the SDPF is not in the low temperature region; and performing, by the controller, a transient region correction when the temperature inside the SDPF is in the transient region.

The correction method of NOx purifying efficiency of SDPF in another exemplary form may further include: determining, by the controller, whether the temperature inside the SDPF is in a high temperature region when the temperature inside the SDPF is not in the transient region; and performing, by the controller, a high temperature region correction when the temperature inside the SDPF is in the high temperature region.

The correction method of NOx purifying efficiency of SDPF according to an exemplary form of the present disclosure may further include performing, by the controller, urea injection amount correction when the temperature change per unit time inside the SDPF is greater than the first predetermined value.

The correction method of NOx purifying efficiency of SDPF according to an exemplary form may further include performing, by the controller, urea injection amount correction when the difference between the maximum value and the minimum value of temperature of the respective parts inside the SDPF is greater than the second predetermined value.

The first predetermined value may be approximately 10° C., and the second predetermined value may be approximately 20° C.

The low temperature region may be a temperature region between approximately 170° C. and 250° C.

The transient region may be a temperature region between approximately 250° C. and 300° C.

The high temperature region may be a temperature region of over approximately 300° C.

The low temperature region correction may include calculating a current purifying efficiency of the SDPF, calculating a maximum purifying efficiency of the SDPF, calculating a space velocity (SV) of the SDPF, calculating a low temperature region correction factor, and calculating a corrected SV.

The current purifying efficiency of the SDPF may be calculated as a ratio of a difference value between an NOx amount detected by a front sensor disposed at a front end of the SDPF and an NOx amount detected by a rear sensor disposed at a rear end of the SDPF divided by the NOx amount detected by the front sensor of the SDPF.

The maximum purifying efficiency of the SDPF may be calculated as a ratio of the current purifying efficiency of the SDPF divided by a ratio of a current NH3 absorption amount at a current temperature divided by an NH3 maximum absorption amount of the SDPF.

The SV of the SDPF may be calculated by applying the temperature inside the SDPF and the maximum purifying efficiency of the SDPF.

The low temperature region correction factor may be calculated as a ratio of the SV of the SDPF divided by a model SV of the SDPF.

The corrected SV may be calculated by multiplying the low temperature region correction factor to the model SV of the SDPF.

The high temperature region correction may be performed by using a high temperature region correction factor calculated as a ratio of a NOx amount detected by the rear sensor disposed at the rear end of the SDPF divided by a model NOx amount of the rear end of the SDPF.

The transient region correction may be calculated by multiplying a transient region correction factor to a model NOx purifying efficiency of the SDPF after calculating the transient region correction factor by multiplying a weight according to a temperature to the low temperature region correction factor and the high temperature region correction factor, respectively.

According to an exemplary form of the present disclosure, accuracy of NOx purifying efficiency correction based on temperature inside the SDPF may be improved, accordingly, urea consumption amount injected from an injection module may be reduced and purifying performance of NOx may be improved.

In addition, deterioration of purifying performance due to degradation of the SDPF may be improved, and error of the purifying efficiency compared with a predetermined model value may be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
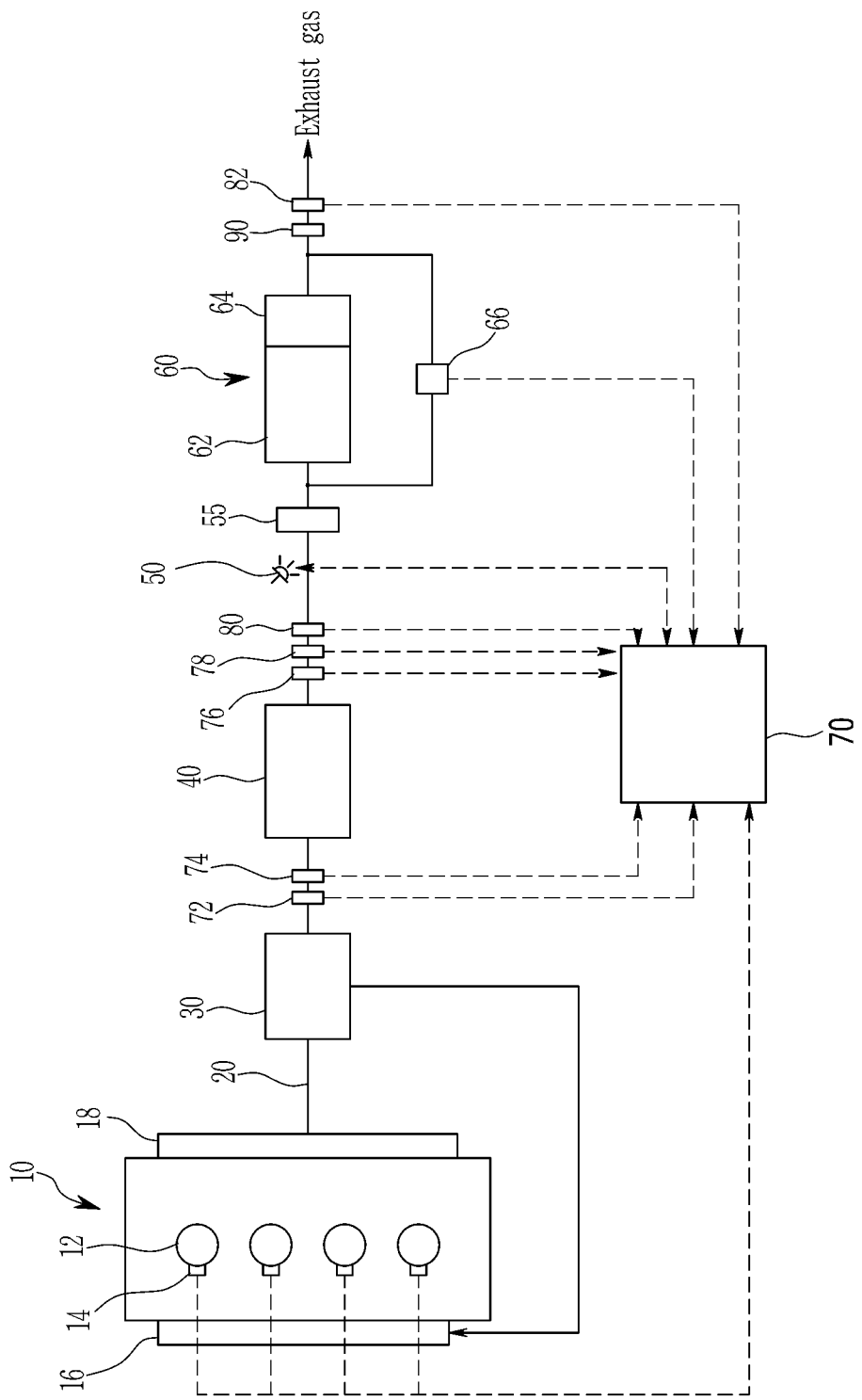
FIG. 1 is a schematic view showing an exhaust system in an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, since the sizes and thickness of each of constituent elements in drawings is randomly shown for the convenience of explanation, the present disclosure illustrated in the drawings is not limited to thereof and several portions and regions may be exaggerated for clarity.

In order to clarify the present disclosure, parts that are not connected with the description will be omitted, and the same elements or equivalents are referred to as the same reference numerals throughout the present disclosure.

In a detailed description, in order to distinguish the same constituent elements, a first and a second, etc., are used as names of constituent elements and do not represent the order.

FIG. 1 is a schematic view showing an exhaust system in an exemplary form of the present disclosure.

Referring to FIG. 1, the exhaust system includes an engine 110, an exhaust pipe 20, an exhaust gas recirculation (EGR) device 30, a lean NOx trap (LNT) 40, an injection module 50, a particulate filter 60, and a controller 70.

The engine 10 burns air/fuel mixture in which fuel and air are mixed so as to convert chemical energy into mechanical energy. The engine 10 is connected to an intake manifold so as to receive the air in a combustion chamber, and is connected to an exhaust manifold such that exhaust gas generated in combustion process is gathered in the exhaust manifold and is exhausted to the exterior. An injector is mounted in the combustion chamber so as to inject the fuel into the combustion chamber.

Herein, a diesel engine is exemplified, but a lean burn gasoline engine may also be used. When the gasoline engine is used, the mixture is introduced into the combustion chamber 12 through the intake manifold 16, and an ignition plug (not illustrated) for ignition is installed on the combustion chamber 12. Further, in the case of using a gasoline direct injection (GDI) engine, the injector 14 is installed on the combustion chamber 12, like a diesel engine.

The exhaust pipe 20 is connected to the exhaust manifold 18 to discharge the exhaust gas to the outside of the vehicle. The LNT catalyst 40, the injection module 50 and the SDPF 60 are installed on the exhaust pipe 20 to remove hydrocarbon, carbon monoxide, particulate matters, and nitrogen oxide included in the exhaust gas.

The EGR device 30 is installed on the exhaust pipe 20 to re-supply a part of the exhaust gas discharged from the engine 10 to the engine 10 through the EGR device 30. Further, the EGR device 30 is connected to the intake manifold 16 to control a combustion temperature by mixing a part of the exhaust gas with the air. This control of the combustion temperature is performed by controlling an amount of exhaust gas supplied to the intake manifold 16 under the control of the controller 70.

A recirculation valve (not illustrated) controlled by the controller 70 may be installed on a line connecting the EGR device 30 and the intake manifold 16.

A first oxygen sensor 72 is installed on the rear exhaust pipe 20 of the EGR device 30 to detect an amount of oxygen in the exhaust gas passing through the EGR device 30 and transmit the detected oxygen amount to the controller 70, thereby allowing the controller 70 to help in performing a lean/rich control of the exhaust gas. In the present specification, a measured value of the first oxygen sensor 72 is referred to as an air-fuel ratio of the front end of the LNT.

Further, a first temperature sensor 74 is installed on the rear exhaust pipe 20 of the EGR device 30 to detect a temperature of the exhaust gas that passes through the EGR device 30.

The LNT catalyst 40 is installed on the rear exhaust pipe 20 of the EGR device 30. The LNT catalyst 40 adsorbs nitrogen oxide (NOx) included in the exhaust gas in a lean atmosphere, desorbs the nitrogen oxide adsorbed in a rich atmosphere, and reduces the nitrogen oxide included in the exhaust gas or the desorbed nitrogen oxide. Further, the LNT catalyst 40 oxidizes carbon monoxide (CO) and hydrocarbon (HC) included in the exhaust gas.

Herein, it should be understood that the hydrocarbon refer to all compounds consisting of carbon and hydrogen included in the exhaust gas and the fuel.

A second oxygen sensor 76, a second temperature sensor 78 and a first NOx sensor 80 are installed on the rear exhaust pipe 20 of the LNT catalyst 40.

The second oxygen sensor 76 measures amount of oxygen contained in the exhaust gas introduced into the SDPF 60 to transmit a signal of the measured amount of oxygen to the controller 70. On the basis of detecting values of the first oxygen sensor 72 and the second oxygen sensor 76, the controller 70 may perform lean/rich control. In the present specification, a measured value of the second oxygen sensor 76 is referred to as an air-fuel ratio of the front end of the filter.

The second temperature sensor 78 measures a temperature of the exhaust gas introduced into the particulate filter 60 to transmit a signal of the measured temperature to the controller 70. Here, a third temperature sensor 90 detecting temperature of the exhaust gas exhausting from the SDPF 60 to transmit a signal of the detected temperature to the controller 70 may further disposed.

The first NOx sensor 80 measures an amount of NOx included in the exhaust gas introduced into the particulate filter 60 to transmit a signal of the measured amount to the controller 70. The amount of NOx measured by the first NOx sensor 80 may be used to determine the amount of reducing agent to be injected by the injection module 50.

The injection module 50 is installed in the front exhaust pipe 20 of the SDPF 60 and controlled by the controller 70 to inject the reducing agent to the exhaust gas. Typically, the injection module 50 injects urea, and the injected urea is converted into ammonia by hydrolysis.

However, the reducing agent is not limited to the ammonia. Hereinafter, for convenience of explanation, ammonia is used as the reducing agent, and the injection module 50 injects the urea. However, within the spirit and scope of the appended claims, it is to be understood that using reducing agent except the ammonia is included in the scope of the present disclosure.

A mixer 55 may be installed on the rear exhaust pipe 20 of the injection module 50 to uniformly mix the reducing agent with the exhaust gas.

A mixer 55 may be installed on the rear exhaust pipe 20 of the injection module 50 to uniformly mix the reducing agent with the exhaust gas. For these purposes, the particulate filter 60 includes a selective catalytic reduction catalyst on a diesel particulate filter (SDPF) 62 and an additional selective catalytic reduction catalyst (SCR) 64.

Meanwhile, it should be interpreted that the term 'SCR' includes all of an SCR catalyst itself or the SDPF.

The additional SCR 64 is mounted at the rear of the SDPF 62. The additional SCR 64 further reduces the nitrogen oxide if the SDPF 62 purifies the nitrogen oxide. The additional SCR 64 may be installed to be physically spaced apart from the SDPF 62.

Meanwhile, a pressure difference sensor 66 is mounted on the exhaust pipe 20. The pressure difference sensor 66 detects pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than predetermined pressure.

In this case, the injector 14 post-injects the fuel so as to burn the particulate matter trapped in the particulate filter 60.

In addition, a second NOx sensor 82 is mounted on the exhaust pipe 20 downstream of the particulate filter 60. The second NOx sensor 82 detects amount of the nitrogen oxide contained in the exhaust gas exhausted from the particulate filter 60, and transmits a signal corresponding thereto to the controller 70. The controller 70 can check based on the detected value by the second NOx sensor 82 whether the nitrogen oxide contained in the exhaust gas is normally removed in the particulate filter 60. That is, the second NOx sensor 82 may be used to evaluate performance of the particulate filter 60.

The controller 70 determines driving condition of the engine on a basis of signals detected by each sensor, and controls lean/rich and reductant amount injected from the injection module on a basis of the driving condition of the engine.

For one example, the controller 70 controls the LNT 40 to eliminate NOx (i.e., "regeneration of the LNT" in the present disclosure) by controlling the lambda to be rich, and controls the SDPF 60 to eliminate NOx by injecting reductant. The lean/rich control may be performed by adjusting fuel amount injected from the injector 14 and injection timing.

Meanwhile, the controller 70 calculates temperature inside the SDPF 62, ammonia amount absorbed in the SDPF 62, and NOx exhaust amount of a rear end of the LNT 40, and on a basis of these, expects NOx purifying rate of the SDPF 62.

For this purpose, characteristics of ammonia absorption/oxidation according to temperature inside the particulate filter 60, characteristics of ammonia desorption according to temperature inside the particulate filter 60, and characteristics of NOx slip of the LNT 40 in a rich atmosphere etc. are stored in the controller 70.

The characteristics of ammonia absorption/oxidation according to temperature inside the particulate filter 60, the characteristics of ammonia desorption according to temperature inside the particulate filter 60, and the characteristics of NOx slip of the LNT 40 in a rich atmosphere etc. may be predetermined by experiments and stored as map data. In addition, the controller 70 performs a regeneration of the particulate filter 60 and a desulfuration of the LNT 40.

For this purpose, the controller 70 can be realized by one or more processors activated by a predetermined program, and the predetermined program can be programmed to perform each step of control method of an exhaust gas purifying device in one form of this present disclosure.

Figure 2:
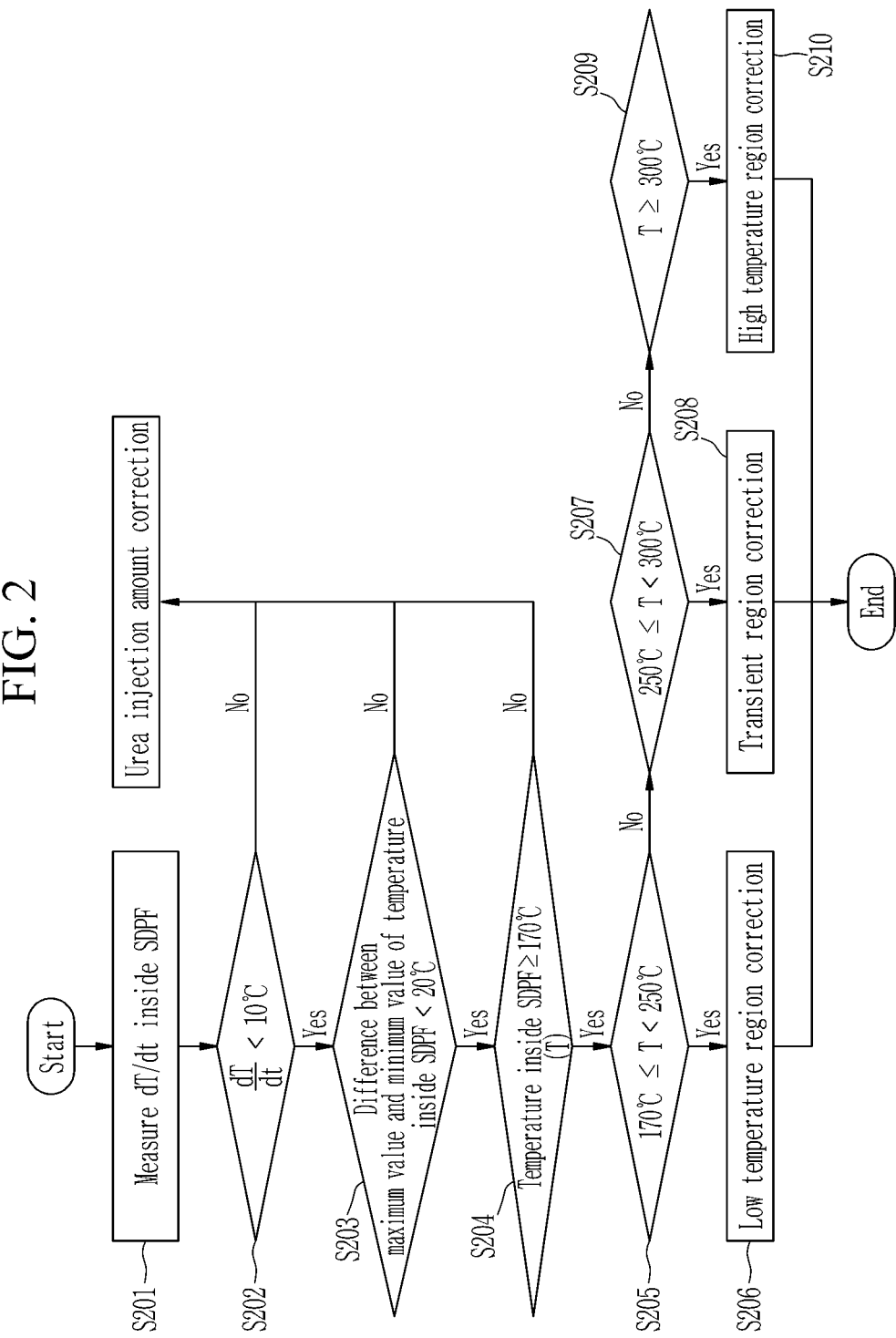
FIG. 2 is a flowchart showing a correction method of NOx purifying efficiency in an exemplary form of the present disclosure.

FIG. 2 is a flowchart showing a correction method of NOx purifying efficiency as an exemplary form of the present disclosure.

Referring to FIG. 2, when the engine 10 starts, the controller 70 starts to control.

First, the controller 70 calculates temperature inside the SDPF. The controller 70 may calculate the temperature inside the SDPF 62 according to driving information. Here, the driving information may include RPM of the engine 10, fuel injection amount, outside air temperature, or coolant temperature etc.

The controller 70 measures a temperature change per unit time (dT/dt) inside the SDPF 62 in step S201.

Then, the controller 70 determines whether the temperature change per unit time inside the SDPF 62 is below a first predetermined value in step S202. At this time, the first predetermined value may be about 10° C.

The controller 70 determines whether a difference between a maximum value and a minimum value of temperature of respective parts inside the SDPF 62 is below a second predetermined value if the temperature change per unit time inside the SDPF 62 is below the first predetermined value S203. At this time, the second predetermined value may be about 20° C.

Then, the controller 70 determines whether a temperature inside the SDPF 62 is over 170° C. S204 and whether a temperature inside the SDPF 62 is in a low temperature region S205 if the difference between the maximum value and the minimum value of temperature of the respective parts inside the SDPF 62 is below the second predetermined value.

Then, the controller 70 performs a low temperature region correction if the temperature inside the SDPF 62 is in the low temperature region S206. At this time, the low temperature region is a temperature region of over about 170° C. and below about 250° C.

The controller determines whether the temperature inside the SDPF 62 is in a transient region if the temperature inside the SDPF 62 is not in the low temperature region S207, and performs a transient region correction if the temperature inside the SDPF 62 is in the transient region S208. At this time, the transient region may be a temperature region of over about 250° C. and below about 300° C.

Then, the controller determines whether the temperature inside the SDPF 62 is in a high temperature region if the temperature inside the SDPF is not in the transient region S209, and performs a high temperature region correction if the temperature inside the SDPF 62 is in the high temperature region S210. At this time, the high temperature region may be a temperature region of over about 300° C.

Meanwhile, the controller 70 performs urea injection amount correction if the temperature change per unit time inside the SDPF is over the first predetermined value, and although the temperature change per unit time inside the SDPF is below the first predetermined value, the controller 70 performs urea injection amount correction if the difference between the maximum value and the minimum value of temperature of the respective parts inside the SDPF 62 is over the second predetermined value. In addition, the controller 70 performs urea injection amount correction if the temperature inside the SDPF 62 is below 170° C.

Figure 3:
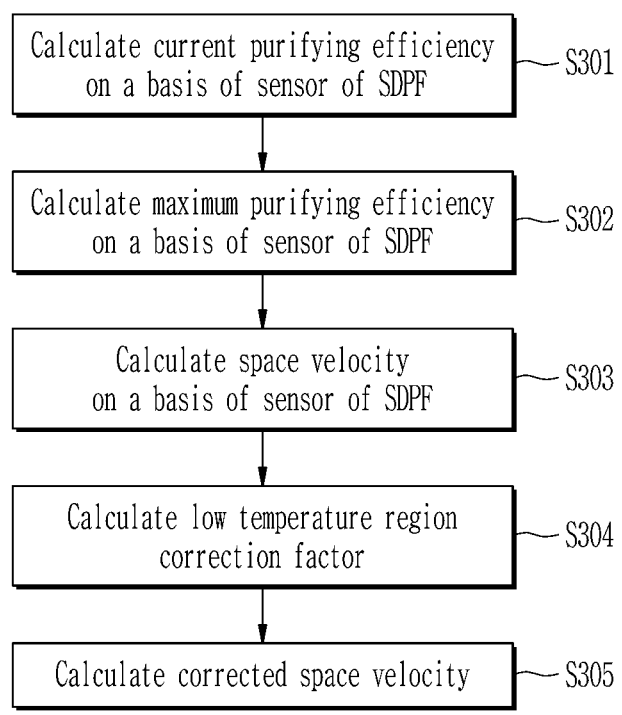
FIG. 3 is a flowchart showing a correction method of NOx purifying efficiency in a low temperature region of the SDPF in one form of the present disclosure.

FIG. 3 is a flowchart showing a correction method of NOx purifying efficiency in a low temperature region of the SDPF according to an exemplary form of the present disclosure.

Referring to FIG. 3, a low temperature region correction may be performed when the temperature change per unit time inside the SDPF 62 is below the first predetermined value, the difference between the maximum value and the minimum value of temperature of the respective parts inside the SDPF 62 is over the second predetermined value, and the temperature inside the SDPF 62 is in the low temperature region, that is, the temperature region of over about 170° C. and below about 250° C.

In the low temperature region correction, firstly, a current purifying efficiency on a basis of a sensor of the SDPF ($\eta_{SDPF,\ sensor}$) is calculated S301. The current purifying efficiency on a basis of the sensor of the SDPF 62 ($\eta_{SDPF,\ sensor}$) may be calculated as a ratio of a difference value between an NOx amount on a basis of the sensor of a front end of the SDPF 62 and an NOx amount on a basis of the sensor of a rear end of the SDPF 62 divided by the NOx amount on a basis of the sensor of a front end of the SDPF 62 (($NOx_{front\ end\ sensor} - NOx_{rear\ end\ sensor}$)/$NOx_{front\ end\ sensor}$).

Then, a maximum purifying efficiency on a basis of the sensor of the SDPF 62 ($\eta_{SDPF,sensor,max}$) is calculated S302. The maximum purifying efficiency on a basis of the sensor of the SDPF 62 ($\eta_{SDPF,sensor,max}$) may be calculated as a ratio of the current purifying efficiency on a basis of the sensor of the SDPF 62 divided by a ratio of a current NH3 absorption amount at a current temperature divided by an NH3 maximum absorption amount of the SDPF 62 ($\eta_{SDPF,sensor}/fac_{NH3Id,Max}$).

Then, a space velocity on a basis of the sensor of the SDPF 62 SV ($SV_{SDPF,sensor}$) is calculated S303. The SV on a basis of the sensor of the SDPF 62 ($SV_{SDPF,sensor}$) may be calculated by applying the temperature inside the SDPF 62 ($T_{SDPF}$) and the maximum purifying efficiency on a basis of the sensor of the SDPF 62 ($\eta_{SDPF,sensor,max}$). The maximum purifying efficiency on a basis of the sensor of the SDPF 62 ($\eta_{SDPF,sensor,max}$) is a function value having variables of the temperature inside the SDPF 62 ($T_{SDPF}$) and the space velocity on a basis of the sensor of the SDPF 62 ($SV_{SDPF,sensor}$) and predetermined as the function of a graph illustrated in the FIG. 4.

Then, a low temperature region correction factor ($fac_{SDPF}$) is calculated S304. The low temperature region correction factor ($fac_{SDPF}$) is calculated as a ratio of the SV on a basis of the sensor of the SDPF 62 ($SV_{SDPF,sensor}$) divided by the model SV of the SDPF 62 ($SV_{SDPF,model}$).

Then, a corrected SV ($SV_{SDPF, model, correction}$) is calculated S305. The corrected SV ($SV_{SDPF, model, correction}$) is calculated by multiplying the low temperature region correction factor ($fac_{SDPF}$) to the model SV of the SDPF 62 ($SV_{SDPF,model}$).

Figure 4:
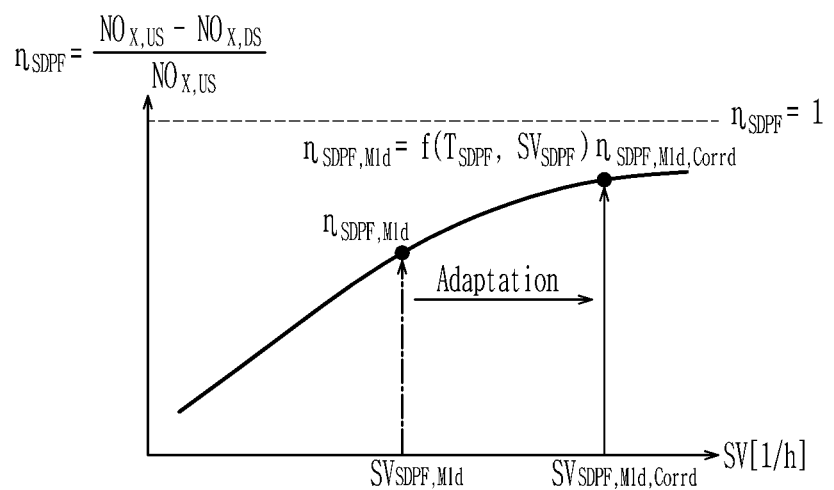
FIG. 4 is a graph for explaining a correction method of NOx purifying efficiency in a low temperature region of the SDPF as an exemplary form of the present disclosure.

Referring to FIG. 4, a graph of an SDPF purifying efficiency to the SV value in the low temperature region is predetermined by experiments. The model SDPF purifying efficiency ($\eta_{SDPF,Mld}$) is predetermined when the SV is model SV value ($SV_{SDPF, model, correction}$), and the corrected SDPF purifying efficiency ($\eta_{SDPF, Mld, Corrd}$) is predetermined when the SV is a corrected SV value ($SV_{SDPF, model, correction}$).

Meanwhile, a high temperature region correction may be performed when the temperature change per unit time inside the SDPF 62 is below the first predetermined value, the difference between the maximum value and the minimum value of temperature of the respective parts inside the SDPF is below the second predetermined value, and the temperature inside the SDPF 62 is in the high temperature region, that is, the temperature region of over about 300° C.

The high temperature region correction may be performed by using a high temperature region correction factor ($fac_{efficiency}$) calculated as a ratio of the NOx amount on a basis of the sensor of the rear end of the SDPF 62 ($NOx_{rear\ end\ sensor}$) divided by a model NOx amount of the rear end of the SDPF 62 ($NOx_{rear\ end\ model}$).

At this time, the model NOx amount of the rear end of the SDPF 62 ($NOx_{rear\ end\ model}$) is a value that being subtracted the model NOx purifying efficiency of the SDPF 62 ($\eta_{SDPF,Mld}$) from 1, and the NOx amount on a basis of the sensor of the rear end of the SDPF 62 ($NOx_{rear\ end\ sensor}$) is a value that being subtracted the NOx purifying efficiency on a basis of a sensor of the SDPF 62 ($\eta_{SDPF,sensor}$) from 1.

Accordingly, in the high temperature region, the corrected NOx purifying efficiency ($\eta_{SDPF, Mld, Corrd}$) satisfies the below equation 1.

$$\eta_{SDPF,Mld,Corrd}=1-(1-\eta_{SDPF,Mld})*fac_{efficiency} \quad \text{equation 1}$$

Figure 5:
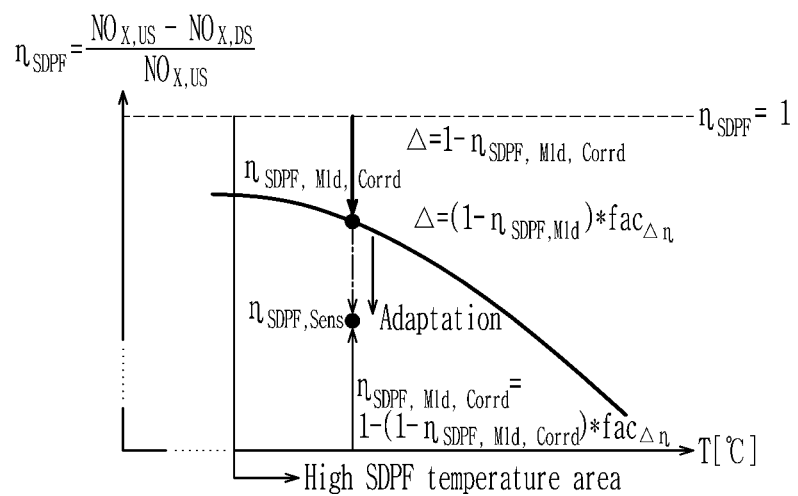
FIG. 5 is a graph for explaining a correction method of NOx purifying efficiency in a high temperature region of the SDPF in an exemplary form of the present disclosure.

Referring to FIG. 5, a graph of an NOx purifying efficiency of the SDPF 62 to the temperature of the SDPF 62 in the high temperature region is predetermined by experiments. The corrected NOx purifying efficiency ($\eta_{SDPF, Mld, Corrd}$) is a value that subtracted the model NOx purifying efficiency ($\eta_{SDPF, Mld}$) from 1, and a value multiplied a high temperature region correction factor ($fac_{efficiency}$) to the value ($1-\eta_{SDPF, Mld}$) from 1. This is expressed as the equation 1 ($1-(1-\eta_{SDPF, Mld})*fac_{efficiency}$).

Meanwhile, a transient region correction may be performed when the temperature change per unit time inside the SDPF 62 is below the first predetermined value, the difference between the maximum value and the minimum value of temperature of the respective parts inside the SDPF 62 is below the second predetermined value, and the temperature inside the SDPF 62 is in the transient region, that is, the temperature region of over about 250° C. and below about 300° C.

The transient region correction may be calculated by multiplying a transient region correction factor to the model NOx purifying efficiency of the SDPF 62 ($\eta_{SDPF, Mld}$) after calculating the transient region correction factor by multiplying a weight according to a temperature to the low temperature region correction factor ($fac_{ASV}$) and the high temperature region correction factor ($fac_{An}$), respectively.

Figure 6:
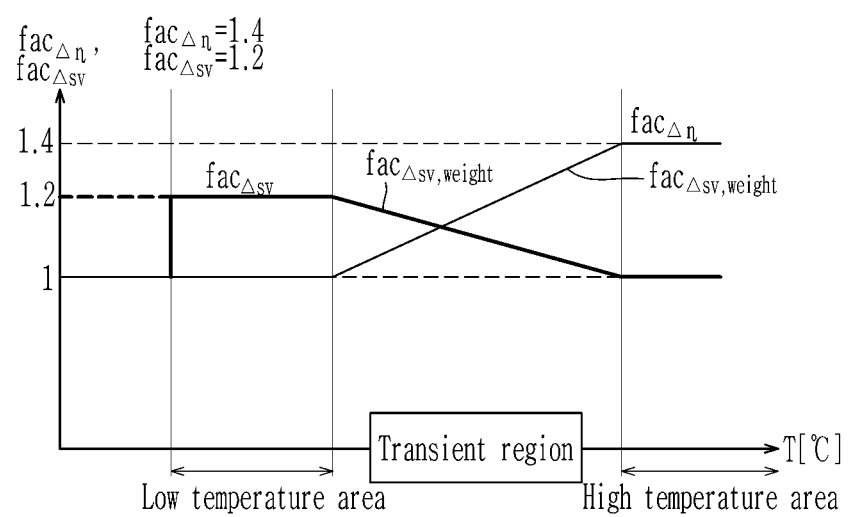
FIG. 6 is a graph for explaining a correction method of NOx purifying efficiency in a transient region of the SDPF in an exemplary form of the present disclosure.

Referring to FIG. 6, in the low temperature region, the low temperature region correction factor ($fac_{ASV}$) may be predetermined to be 1.2, and the high temperature region correction factor ($fac_{An}$) may be predetermined to be 1. In the high temperature region, the low temperature region correction factor ($fac_{ASV}$) may be predetermined to be 1, and the high temperature region correction factor ($fac_{An}$) may be predetermined to be 1.4. In the transient region, a straight line from a maximum value and a minimum value of the low temperature region correction factor ($fac_{ASV}$) and the high temperature region correction factor ($fac_{An}$) respectively is drawn, therefore, the low temperature region correction factor ($fac_{ASV}$) and the high temperature region correction factor ($fac_{An}$) according to the temperature of the SDPF 62 may be calculated. In the corresponding temperature (T) of the SDPF 62, the NOx purifying efficiency of the SDPF 62 ($\eta_{SDPF, Mld, Corrd}$) is calculated through FIG. 4 by applying the low temperature correction factor ($fac_{ASV}$), and the NOx purifying efficiency of the SDPF 62 ($\eta_{SDPF, Mld, Corrd}$) is calculated through FIG. 5 by applying the high temperature correction factor ($fac_{An}$), and they are added together, therefore the NOx purifying efficiency of the SDPF 62 ($\eta_{SDPF, Mld, Corrd}$) in the transient region may be calculated.

Figure 7:
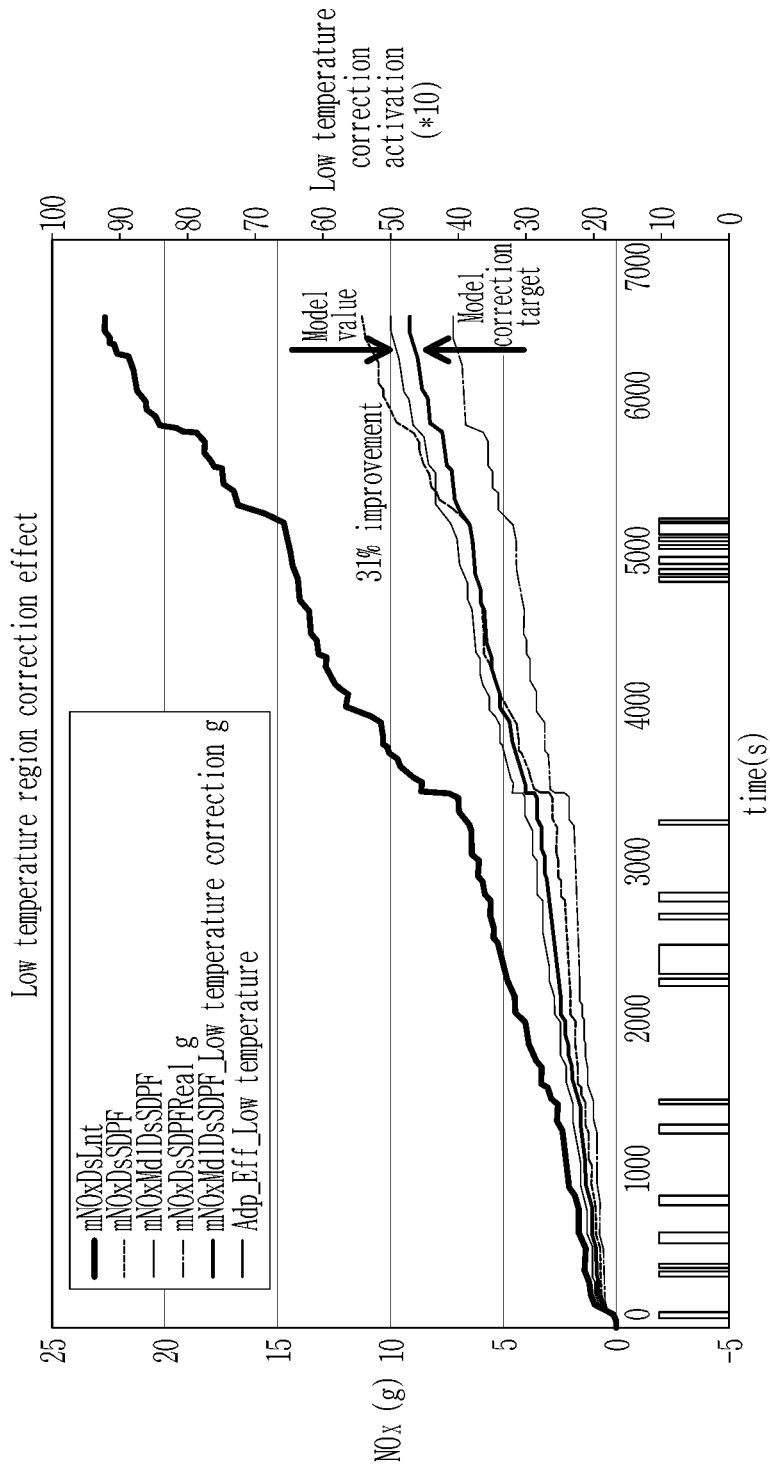
FIG. 7 is a graph showing an improved illustration which accuracy of model before and after correction of NOx purifying efficiency of the SDPF in a low temperature region of the SDPF in an exemplary form of the present disclosure.
Figure 8:
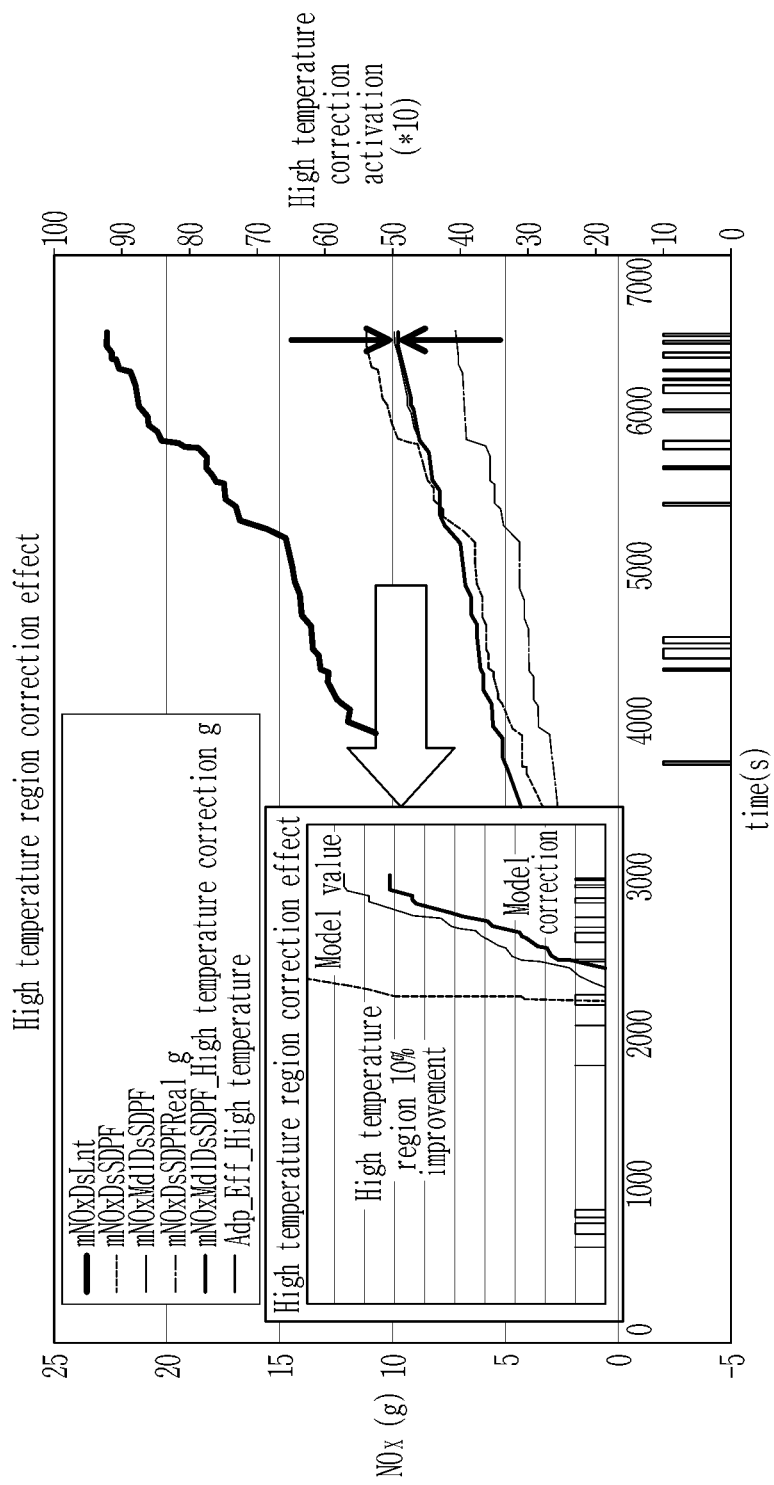
FIG. 8 is a graph showing an improved illustration which accuracy of model before and after correction of NOx purifying efficiency of the SDPF in a high temperature region of the SDPF in an exemplary form of the present disclosure.

FIG. 7 is a graph showing an improved illustration which accuracy of model before and after correction of NOx purifying efficiency of the SDPF in a low temperature region of the SDPF according to an exemplary form of the present disclosure, and FIG. 8 is a graph showing an improved illustration which accuracy of model before and after correction of NOx purifying efficiency of the SDPF in a high temperature region of the SDPF according to an exemplary form of the present disclosure.

Referring to FIG. 7, in the low temperature region, a model NOx accumulation amount of the rear end of the SDPF 62 after correction (mNOxMdlDsSDPF_low temperature correction g) has an about 31% improved correction degree compared to a model NOx accumulation amount of the rear end of the SDPF 62 before correction (mNOxMdlDsSDPF) to a real (target) NOx accumulation amount of the rear end of the SDPF 62 (mNOxDsSDPFReal g).

In addition, referring to FIG. 8, in the high temperature region, a model NOx accumulation amount of the rear end of the SDPF 62 after correction (mNOxMdlDsSDPF_high temperature correction g) has an about 10% improved correction degree compared to a model NOx accumulation amount of the rear end of the SDPF 62 before correction (mNOxMdlDsSDPF) to a real (target) NOx accumulation amount of the rear end of the SDPF 62 (mNOxDsSDPFReal g).

Like this, according to an exemplary form of the present disclosure, accuracy of NOx purifying efficiency correction according to temperature inside the SDPF may be improved, accordingly, urea consumption amount injected from an injection module may be reduced and purifying performance of NOx may be improved.

In addition, deterioration of purifying performance due to degradation of the SDPF may be improved, and error of the purifying efficiency compared with a predetermined model value may be reduced.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

| | |
|---|---|
| 10: engine | 30: exhaust gas recirculation device |
| 40: lean NOx strap(LNT) | 50: injection module |
| 60: particulate filter | 62: SDPF |
| 70: controller | |

What is claimed is:

1. A correction method of NOx purifying efficiency of a selective catalytic reduction catalyst on diesel particulate filter (SDPF), the correction method comprising:
    measuring, by a controller, a temperature change per unit time inside the SDPF;
    determining, by the controller, whether the temperature change per unit time inside the SDPF is less than or equal to a first predetermined value;
    determining, by the controller, whether a difference between a maximum value and a minimum value of temperature of respective parts inside the SDPF is less than or equal to a second predetermined value when the temperature change per unit time inside the SDPF is less than or equal to the first predetermined value;
    determining, by the controller, whether a temperature inside the SDPF is in a low temperature region when the difference between the maximum value and the minimum value of temperature of the respective parts inside the SDPF is less than or equal to the second predetermined value; and
    performing, by the controller, a low temperature region correction when the temperature inside the SDPF is in the low temperature region.

2. The correction method of claim 1, further comprising:
    determining, by the controller, whether the temperature inside the SDPF is in a transient region when the temperature inside the SDPF is not in the low temperature region, and
    performing, by the controller, a transient region correction when the temperature inside the SDPF is in the transient region.

3. The correction method of claim 2, further comprising:
    determining, by the controller, whether the temperature inside the SDPF is in a high temperature region when the temperature inside the SDPF is not in the transient region, and performing a high temperature region correction when the temperature inside the SDPF is in the high temperature region.

4. The correction method of claim 3, wherein:
    the high temperature region is a temperature region of over approximately 300° C.

5. The correction method of claim 3, wherein:
    the high temperature region correction is performed by using a high temperature region correction factor calculated as a ratio of a NOx amount detected by a rear sensor disposed at a rear end of the SDPF divided by a model NOx amount of the rear end of the SDPF.

6. The correction method of claim 5, wherein:
    the transient region correction is calculated by multiplying a transient region correction factor to a model NOx purifying efficiency of the SDPF after calculating the transient region correction factor by multiplying a weight according to a temperature to the low temperature region correction factor and the high temperature region correction factor, respectively.

7. The correction method of claim 2, wherein:
    the transient region is a temperature region between approximately 250° C. and 300° C.

8. The correction method of claim 1, further comprising:
    performing, by the controller, urea injection amount correction when the temperature change per unit time inside the SDPF is greater than the first predetermined value.

9. The correction method of claim 1, further comprising:
    performing, by the controller, urea injection amount correction when the difference between the maximum value and the minimum value of temperature of the respective parts inside the SDPF is greater than the second predetermined value.

10. The correction method of claim 1, wherein:
    the first predetermined value is approximately 10° C., and the second predetermined value is approximately 20° C.

11. The correction method of claim 1, wherein:
    the low temperature region is a temperature region between approximately 170° C. and 250° C.

12. The correction method of claim 1, wherein:
    the low temperature region correction includes:
    calculating a current purifying efficiency of the SDPF;
    calculating a maximum purifying efficiency of the SDPF;
    calculating a space velocity (SV) of the SDPF;
    calculating a low temperature region correction factor; and
    calculating a corrected SV.

13. The correction method of claim 12, wherein:
    the current purifying efficiency of the SDPF is calculated as a ratio of a difference value between an NOx amount detected by a front sensor disposed at a front end of the SDPF and an NOx amount detected by a rear sensor disposed at a rear end of the SDPF divided by the NOx amount detected by the front sensor of the SDPF.

14. The correction method of claim 13, wherein:
    the maximum purifying efficiency of the SDPF is calculated as a ratio of the current purifying efficiency of the SDPF divided by a ratio of a current NH3 absorption amount at a current temperature divided by an NH3 maximum absorption amount of the SDPF.

15. The correction method of claim 14, wherein:
    the SV of the SDPF is calculated by applying the temperature inside the SDPF and the maximum purifying efficiency of the SDPF.

16. The correction method of claim 15, wherein:
    the low temperature region correction factor is calculated as a ratio of the SV of the SDPF divided by a model SV of the SDPF.

17. The correction method of claim 16, wherein:
    the corrected SV is calculated by multiplying the low temperature region correction factor to the model SV of the SDPF.

* * * * *